(12) United States Patent
Matt

(10) Patent No.: US 6,416,245 B1
(45) Date of Patent: Jul. 9, 2002

(54) DEVICE COMPRISING A SHAFT AND AT LEAST ONE HUB WHICH IS ATTACHED TO SAID SHAFT, AND A METHOD FOR PRODUCING THIS DEVICE

(75) Inventor: Lukas Matt, Mauren (LI)

(73) Assignee: Thyssen Krupp Automotive AG, Bochum (DE)

( * ) Notice: Subject to any disclaimer, the term of this patent is extended or adjusted under 35 U.S.C. 154(b) by 0 days.

(21) Appl. No.: 09/446,971
(22) PCT Filed: Apr. 28, 1999
(86) PCT No.: PCT/CH99/00175
  § 371 (c)(1),
  (2), (4) Date: Mar. 15, 2000
(87) PCT Pub. No.: WO99/57450
  PCT Pub. Date: Nov. 11, 1999

(30) Foreign Application Priority Data

May 4, 1998 (CH) ................................................ 995/98

(51) Int. Cl.⁷ .................................................. F16B 4/00
(52) U.S. Cl. .................... 403/282; 403/375; 403/359.6
(58) Field of Search ............................ 403/359.1, 359.2, 403/375, 359.5, 359.6, 282, 298, 345

(56) References Cited

U.S. PATENT DOCUMENTS

| 2,279,954 A | | 4/1942 | Sipe |
| 2,279,956 A | | 4/1942 | Sipe |
| 4,882,825 A | | 11/1989 | Nakamura |
| 4,903,543 A | * | 2/1990 | Matt ........................... 403/282 |
| 5,307,708 A | * | 5/1994 | Matt ........................... 403/282 |
| 5,503,494 A | | 4/1996 | Kamata et al. |

FOREIGN PATENT DOCUMENTS

| DE | 3732223 | 4/1988 |
| EP | 0291902 | 5/1988 |
| EP | 0521354 | 6/1992 |

* cited by examiner

Primary Examiner—Lynne H. Browne
Assistant Examiner—John R. Cottingham
(74) Attorney, Agent, or Firm—Browdy and Neimark

(57) ABSTRACT

The device comprises a shaft (1) and a hub (2) which is attached to said shaft. One of the edges (10) of the opening (5) in the hub (2) through which the shaft (1) should be passed has a curved profile (11). This profile (11) of the hub edge (10) is tangentially connected to the inner surface (6) of the hub opening (5).

18 Claims, 7 Drawing Sheets

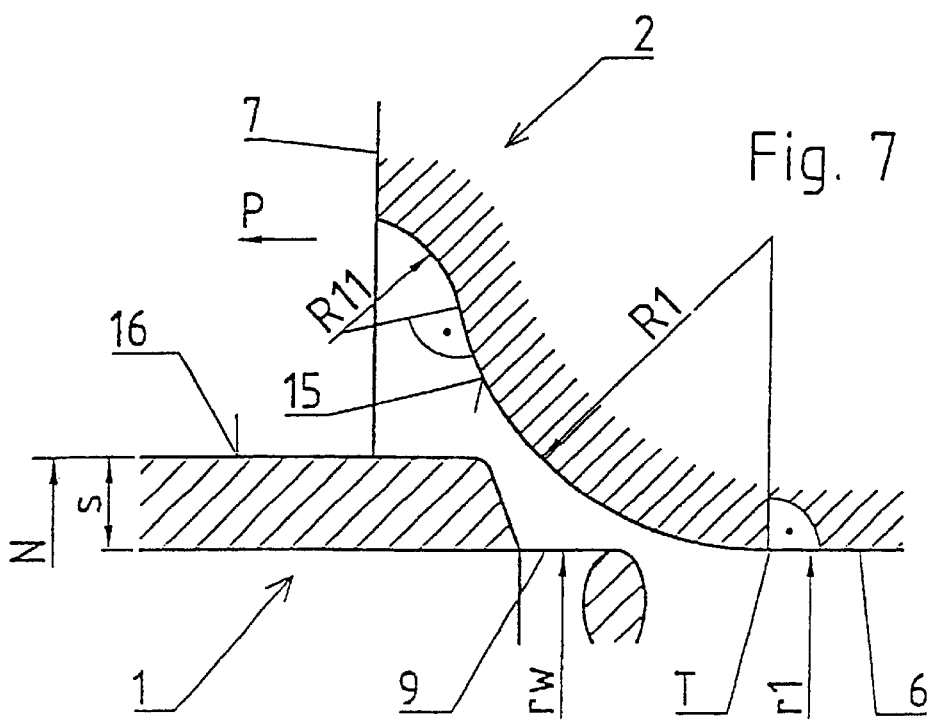
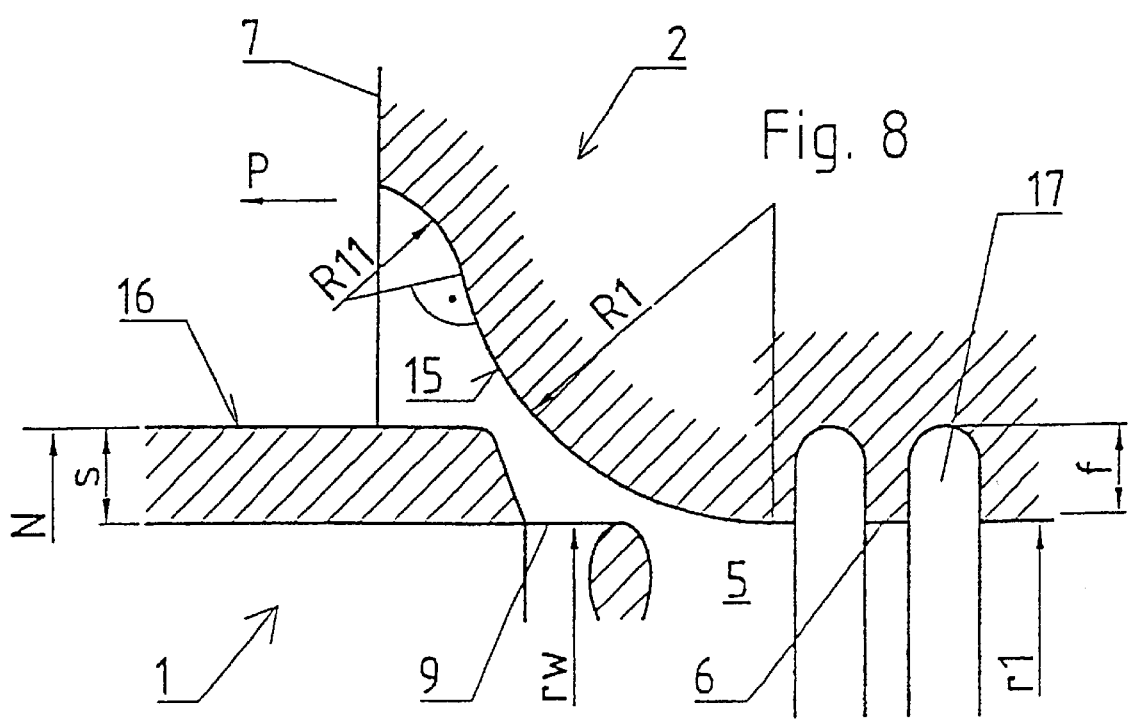

Fig. 15
Fig. 16
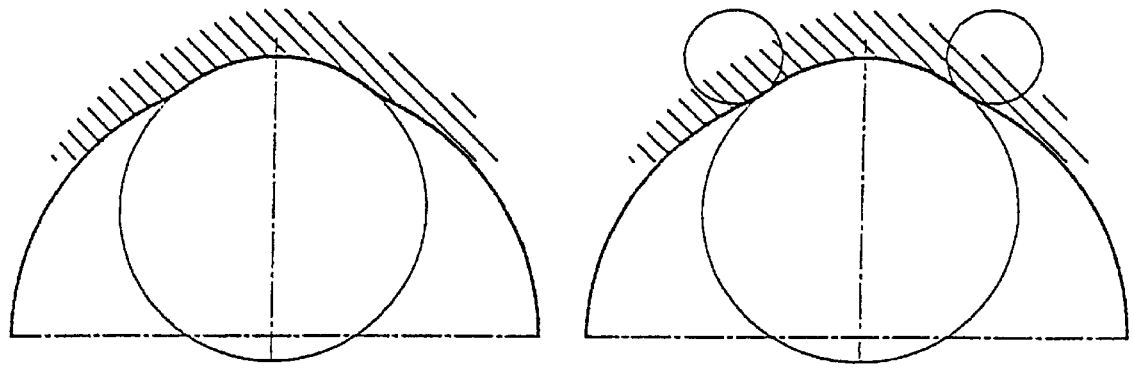
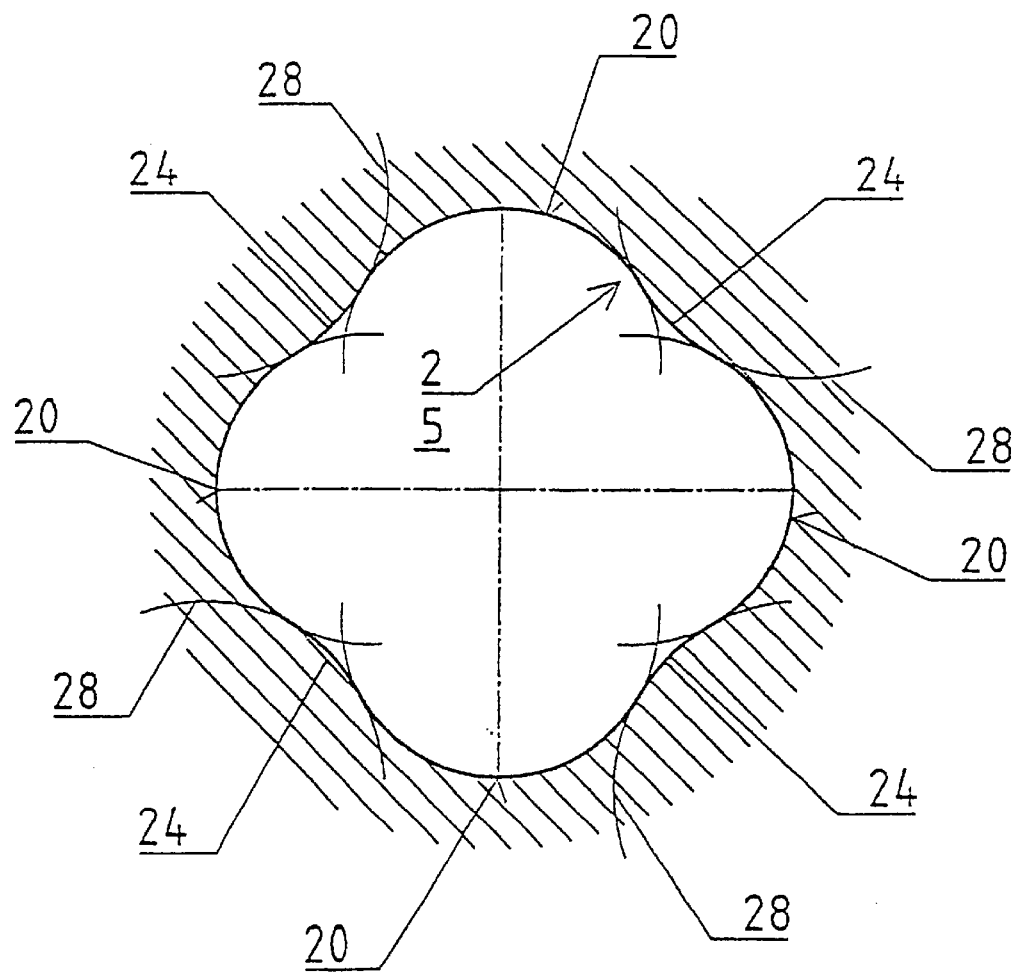
Fig. 17

DEVICE COMPRISING A SHAFT AND AT LEAST ONE HUB WHICH IS ATTACHED TO SAID SHAFT, AND A METHOD FOR PRODUCING THIS DEVICE

The present invention relates to a device with a shaft and with at least one hub attached to this shaft and to a method for manufacturing of this device.

A device of this type is disclosed e.g. in EU-PS 0 521 354. The shaft of this device shows the usual overmeasure with respect to the opening of the hub. The wall opening in the hub has the shape of a cylinder. That one side of the opening in the hub from which the shaft is to be led into the hub is widened, having the shape of a funnel. Otherwise explained, this means that the margin of the opening in the hub is provided with a phase. The inclined wall of this phase has the shape of a cone. If a vertical section is carried out in such a manner that the main axis of the opening is placed in the section plane, then the cut across the phase appears as a straight line. Between said straight line and the equally straight running surface line of the cylindrical opening of the hub, a blunt angle is present.

Said phase facilitates the insertion of the shaft into the hub in such a way that the slanted wall of the phase presses continuously the excessive material of the shaft more deeply into the shaft. That area of the margin of the hub, where said blunt angle is present, acts however as an edge on the shaft. The pressure built up by the compression of the shaft material due to the slanted wall of the phase, grows sudden in the region of said hub edge. As a consequence, material from the shaft surfaces may be torn off by said edge. On the joining surface of the shaft or of the hub resp. which are damaged in this way, the fit of the hub on the shaft is not sufficiently well defined.

It is an object of the present invention is to remove said disadvantage as well as further disadvantages of the prior art.

This object is solved by a device of the afore mentioned type in accordance with the present invention as defined in the characterizing portion of the independent claim 1.

Figure 1:
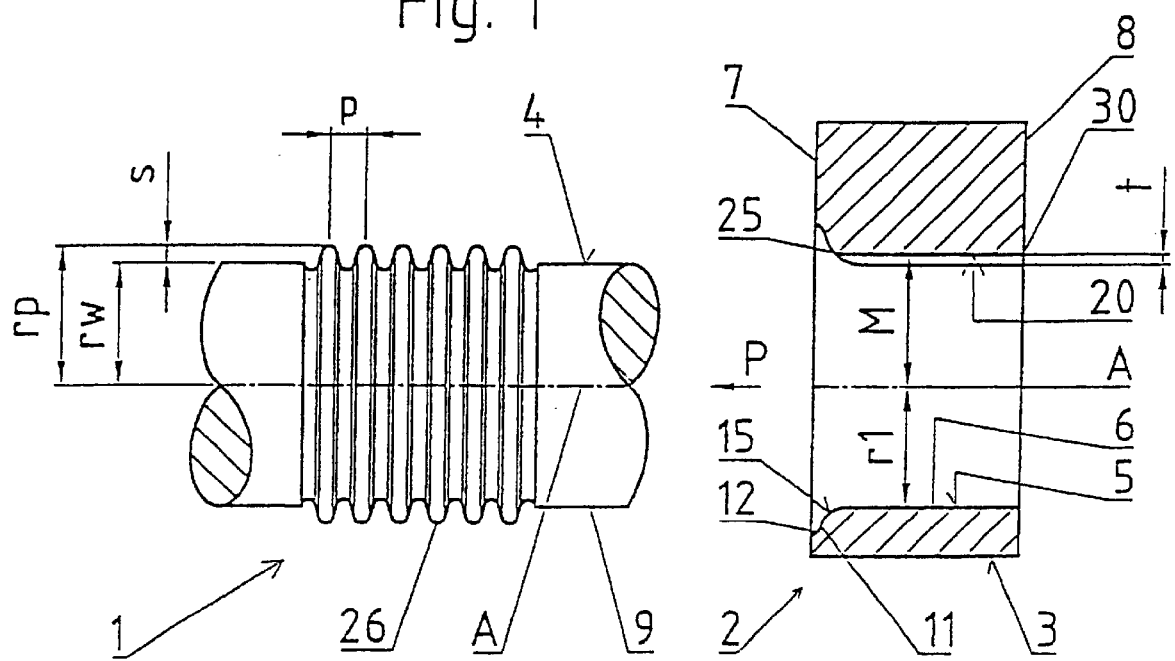
Figure 2:
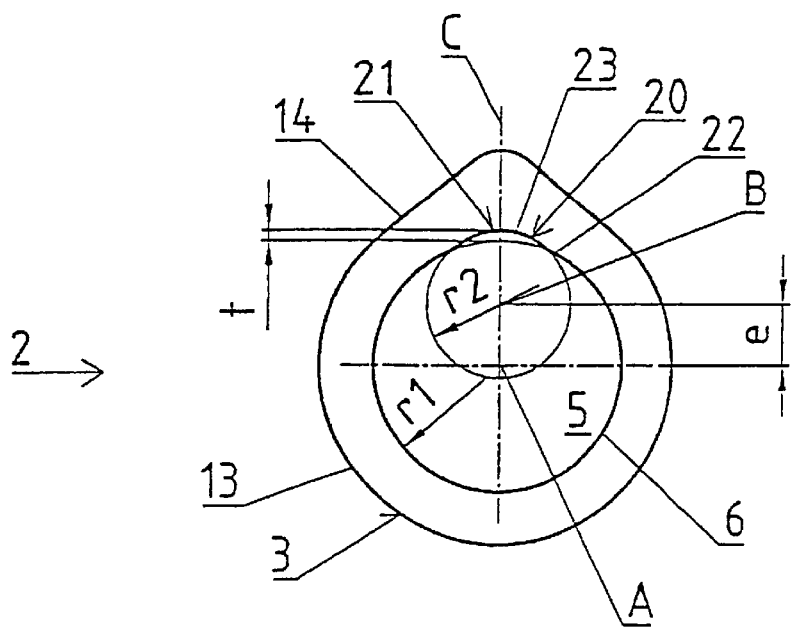
Figure 3:
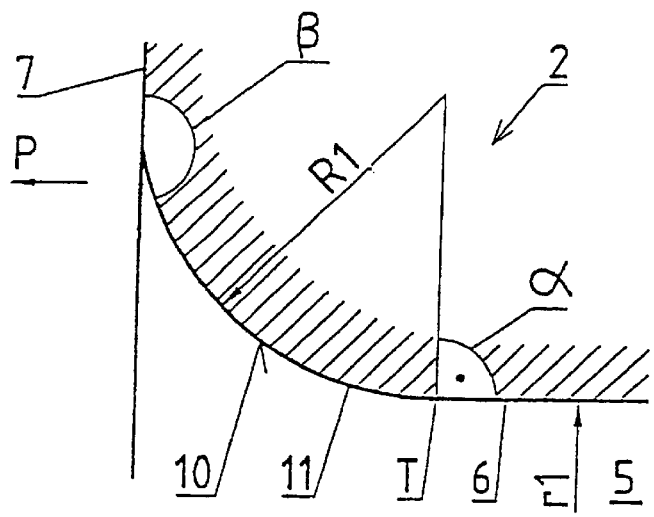
Figure 4:
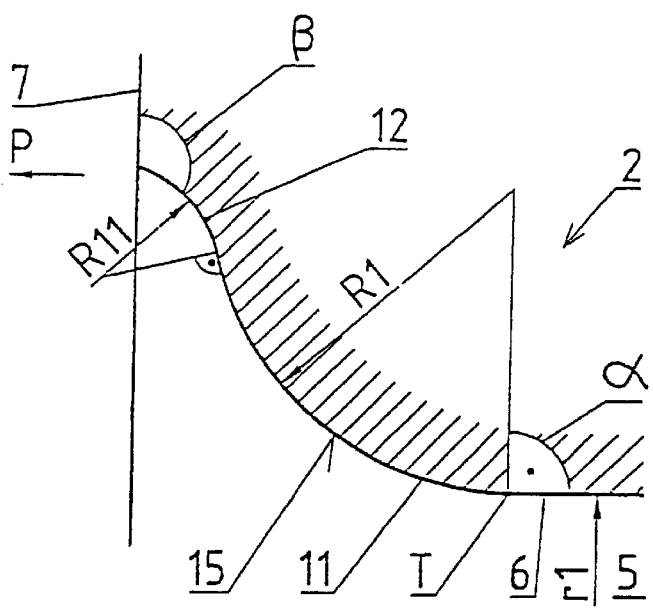
Figure 5:
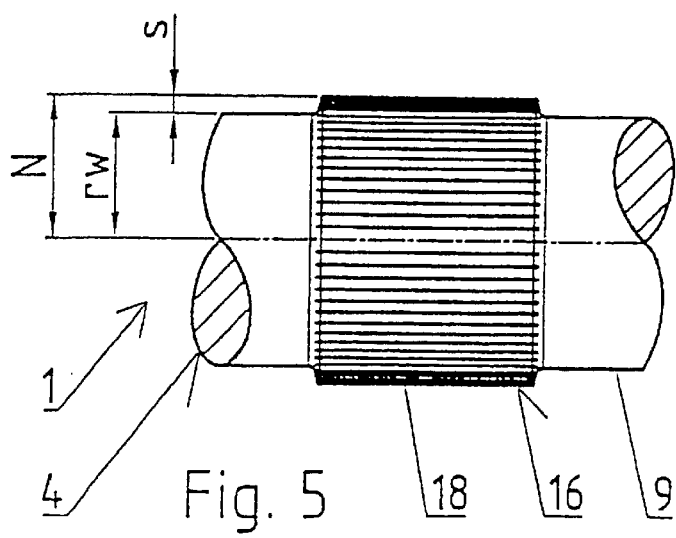
Figure 6:
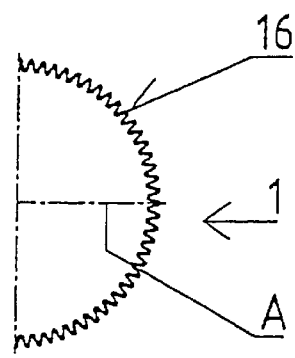
Figure 10:
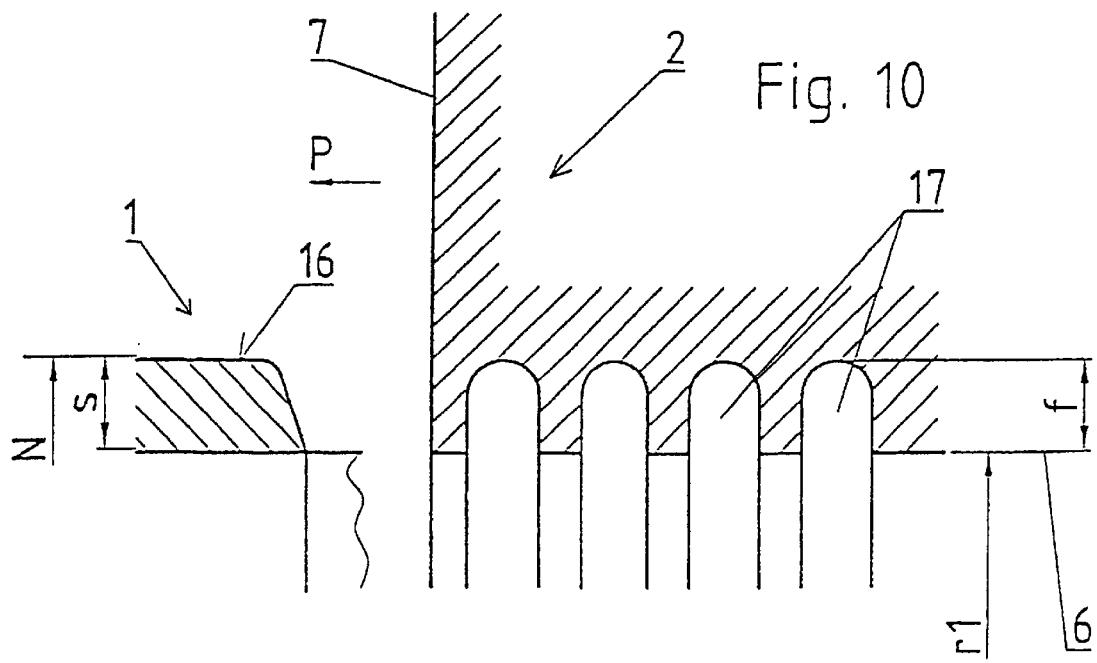
Figure 11:
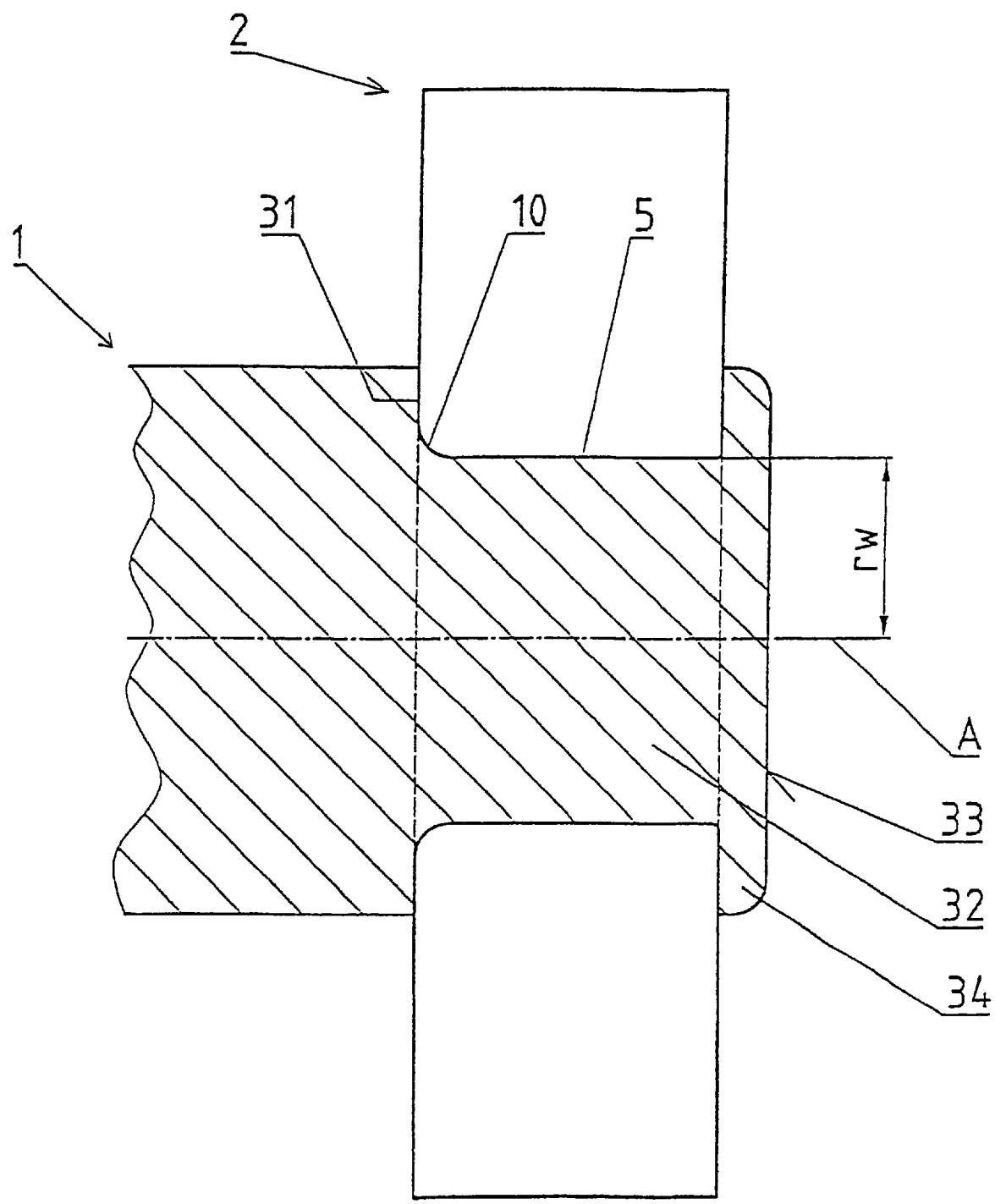
Figure 12:
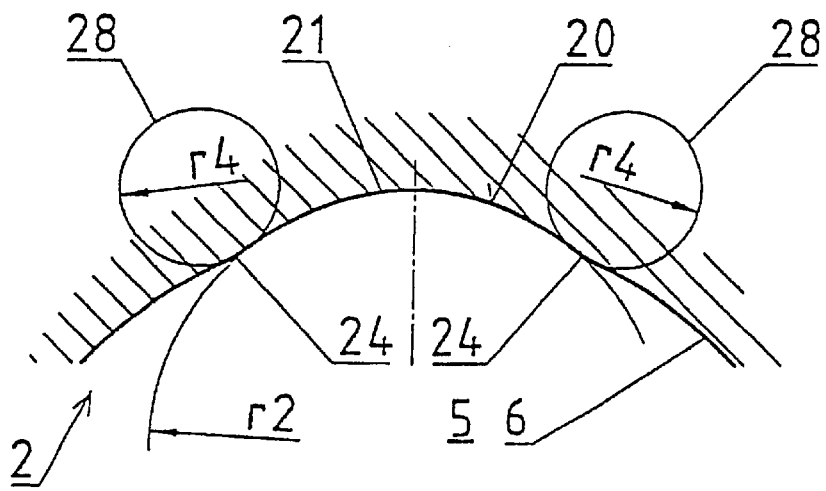
Figure 13:
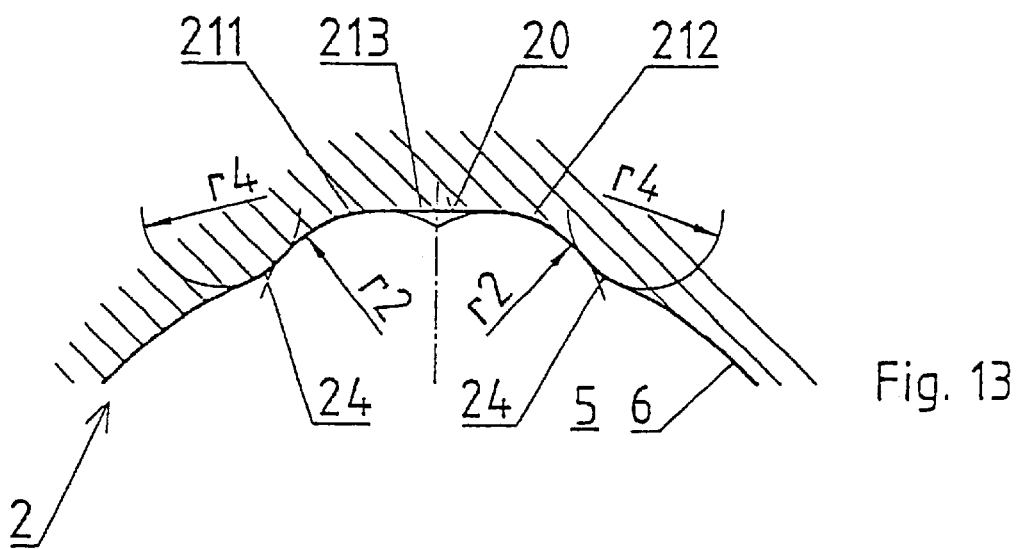
Figure 14:
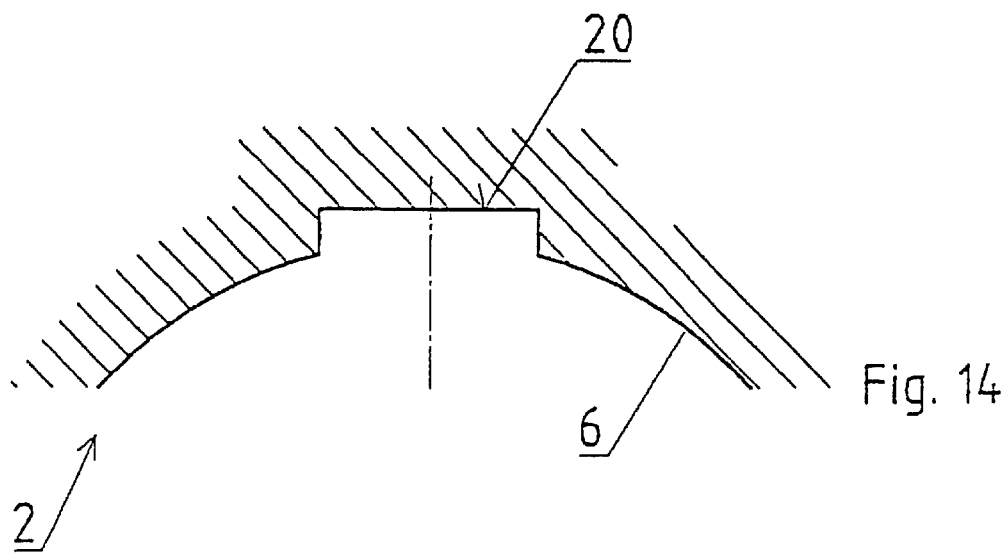

Below, possible embodiments of the present invention are explained in more detail by means of the enclosed figures. It is shown in:

FIG. 1 a shaft and a hub in a vertical cross-section, before the hub is pressed onto the shaft, FIG. 2 a hub which is configured as a cam, in a front view FIG. 3 schematically and in a vertical cut, a detail from a first embodiment of the present invention, FIG. 4 schematically and in a vertical cut, a detail from a second embodiment of the present invention, FIG. 5 in a lateral view, a detail from a shaft, which comprises axially running elevations, FIG. 6 the shaft from FIG. 5 in a cross-section FIGS. 7 to 11 schematically and in a vertical axial cut, each showing an enlarged detail from a respective, further embodiment of the present invention, FIGS. 12 to 14 details from further embodiments of the hub in a front view and FIGS. 15 to 17 a depiction of the manufacture of a hub as shown in FIG. 12, in a front-view on the hub The present device has a shaft 1 and a hub 2 (FIG. 1) which have a common main axis A. The present device may also comprise several hubs 2 on the shaft 1 (not illustrated) In FIG. 1, the hub 2 is spaced in a distance from the shaft 1, i.e. before the hub 2 is placed on the shaft 1. This way of illustration of the present device is better suited to clearly show essential features of the present device.

The hub 2 may be worked as a cam disk (FIG. 2) which has been pressed onto the shaft 1. The shaft 1 together with one or several cam disks 2 constitutes an assembled camshaft. It is obvious that the hub 2 may also be the inside hub of a homo-kinetic joint or a component of a gear, exzenters, a crank-cheek, joint-fork or the like, whereby the hub 2 is being joint to the shaft by form locking or frictional contact. The assembly of shaft 1 and hub 2 may constitute a built crank shaft, mechanism-shaft or driveshaft or a built shaft-fork-connection or the like.

The hub 2 shown in FIG. 1 has a main body 3, which is essentially annular. In this main body 3 an opening 5 is carried out. The wall 6 of this opening 5 has the shape of the coat of a geometrical object whose surface line is a straight line. This geometrical object can be a cylinder or a cone, for instance. To the respective one end portion of the wall 6 of the opening 5 a margin 10, 30 resp. of the opening 5 is attached. The main body 3 shows further lateral surfaces 7 and 8 which are positioned essentially perpendicular with respect to the main axis A.

The shaft 1 has essentially cylindrical main body 4. In order that a pressure joining between shaft 1 and hub 2 can exist, the shaft 1 shows an excess or overmeasure with respect to the opening 5 in the hub 2. Consequently, the radius r1 of the opening 5 in the hub 2 is smaller than the radius rw and rp of the shaft 1, respectively, in the contact area. But it is also possible that the radiuses r1 and rw of the parts 4 and 5 of the present device are essentially identical with respect to their numerical values or that they allow a clearance fit.

FIG. 3 shows schematically and in a vertical cross-section a detail from a first embodiment of the present device. This detail involves only part of the hub 2 and shows one of the margins 10 of the opening 5 in the hub 2. This margin 10 constitutes a transitional region between the inside wall 6 of the opening 5 in the hub 2 and one of the lateral or frontal areas 7 of the main body 3 of the hub 2. If a vertical cross-section is led in such away that the main axis A of the opening 5 lies in the cross-sectional plane, then the cut across this margin 10 of the opening 5 appears as a convex arc 11. That one end section of the curve 11 which is connecting to the surface line of the wall 6 of the opening 5, lies on the same straight line as the beginning of the said surface line of the wall 6.

Otherwise explained, the bent surface 11 of the margin 10 of the opening 5 connects itself tangentially to the inner surface 6 of the opening 5. This means that a tangent to the arc 11 forms the surface line of the inner wall of the drill hole at a point of contact T. This point of contact T is defined as being common both to the arc 11 and to the surface line of the inside-wall 6 of the drill hole or opening 5. The transition between the arc 11 and the surface line of the opening 5 runs continuously, i.e. one and only one tangent may run through the point of contact T. In the example depicted in FIG. 3; the arc 11 has the shape of a circular arc with a radius R1. At the point of contact T, between the radius R1 and the surface line of the wall 6 an angle alpha of 90° extends.

At least that one margin 10, which is positioned in the direction of the pressing force, has in longitudinal cross-section an arched shape 11. But it is without all possible, however, that the opposite margin 30 of the opening (FIG. 1) also has such a contour line in cross-sectional view along the longitudinal axis.

The margin 10 of the opening, having the arched profil or longitudinal section 11, extends between the inner region 6 of the opening 5 in the hub 2 and one of the lateral surfaces 7 or 8, respectively, of the hub 2. Thereby, the arc 11 representing the longitudinal cross-section through the margin 10 may also be tangentially connected to the lateral surface 7 of the hub 2. This is however not necessary. The angle beta which extends between the lateral surface 7 of the hub and the terminal portion of the arc 11 connected to said surface 7 may be smaller than 180°, as it is apparent from FIG. 3.

FIG. 4 shows schematically and in vertical cross-section a detail from a second embodiment of the present invention. The margin 15 of the opening 5 in this device consists from two arcs 11 and 12, seen in a vertical section. That one arc 11 of this opening margin 15, which is connected to the respective surface line of the inner wall 6 of the hub 2 is of a convex shape. That one arc 12 of the hub interior margin 15, which is goes over into the lateral surface 7 of the hub, is of a concave shape. The bows 11 and 12 of the profil of the opening margin 15 meet one another in such a manner that they go tangentially one another. In the embodiment illustrated here, the bows 11 and 12 are circular arcs having the radius R1 and R11. The radius R11 of the second arc 12 is smaller than the radius R1 of the first arc 11.

That one terminal section of the first arc 11, which is connected to the beginning of the surface line of the inside wall 6 of the hub opening 5, lies on the same straight line as the beginning of said surface line of the inner wall 6. This corresponds to that one situation which is illustrated in FIG. 3, so that also in the case of the embodiment according to FIG. 4 a continuous transition without damaging edges is guaranteed. That one terminal section of the second arc 12, which terminates on the lateral surface 7 of the hub, defines a relatively steep angle beta with respect to this lateral surface 7 because of the concave shape of the arc 12.

At such embodiments of the present device, the main body 4 of the shaft 1 may have a smooth, cylindrical outer surface 9. But in certain applications of this device it is necessary that the shaft 1 has an outer surface 9 provided with projections.

FIGS. 5 and 6 show one of such embodiments of the present device whereby the shaft 1 has said projections. These projections are configured as axially running elevations 16 which rise from the cylindrical outer surface 9 of the shaft 1. Such elevations 16 can be formed e.g. by embossing or, preferably, by rolling or milling of the material of the shaft 1, or by chip removing techniques. These elevations 16 can be placed at least in that one area of the length of the shaft 1 which is occupied by the hub 2 pressed onto the shaft 1.

The vertex or top 18 of the respective elevation 16 is located in a distance s over the outer surface 9 of the shaft 1. The distance of the vertex 18 of the respective elevation 16 from the longitudinal axis A amounts to N. N equals rw plus s. A shaft configured in this way is assigned to the hub 2 (FIG. 7), the margin 15 of which consists of the arcs 11 and 12. This profile is illustrated in FIG. 4. The distance N is bigger than the radius r1 of the opening 5 in the hub 2.

In order to further increase the stability of the fit of the hub 2 on the shaft 1, a further embodiment of the present device is foreseen. This embodiment is depicted in FIG. 8 and it is based on the embodiment of the present device described in the foregoing in connection with the FIGS. 5 to 7. The device according to FIG. 8 has circumferential deepenings 17 in the inner wall 6 of the opening 5 of the hub 2. These essentially annular deepenings 17 are spaced apart from each other and are arranged rectangular with respect to the longitudinal axis A of the opening 5. The depth of the deepenings 17 is at least as big as the height s of the axially running elevations 16 on the shaft 1. The axial running elevations 16 are preferably more rub-resistant or harder than the hub 2 in the region of the opening 5.

In the embodiments of this device described in the foregoing, the opening 5 of the hub 2 may be continuously narrower in the width starting from the bowed margin 10 and 15, so that the wall 6 of the opening 5 may adopt the shape of a cone. But the magnitude of the radius r1 of the opening 5 may as well decrease stepwisely. Such shaft-hub-assemblies offer in high-precision-connections the advantage that the contact pressure per unit area may be chosen over the entire width of the hub 2 in such a manner that the hub 2 after the joining has paraxial outer surface lines. This measure allows for example to use grinded tooth-wheels or cams prior to said joining which do not require further grinding or other processing after joining as assembled shafts.

Figure 9:
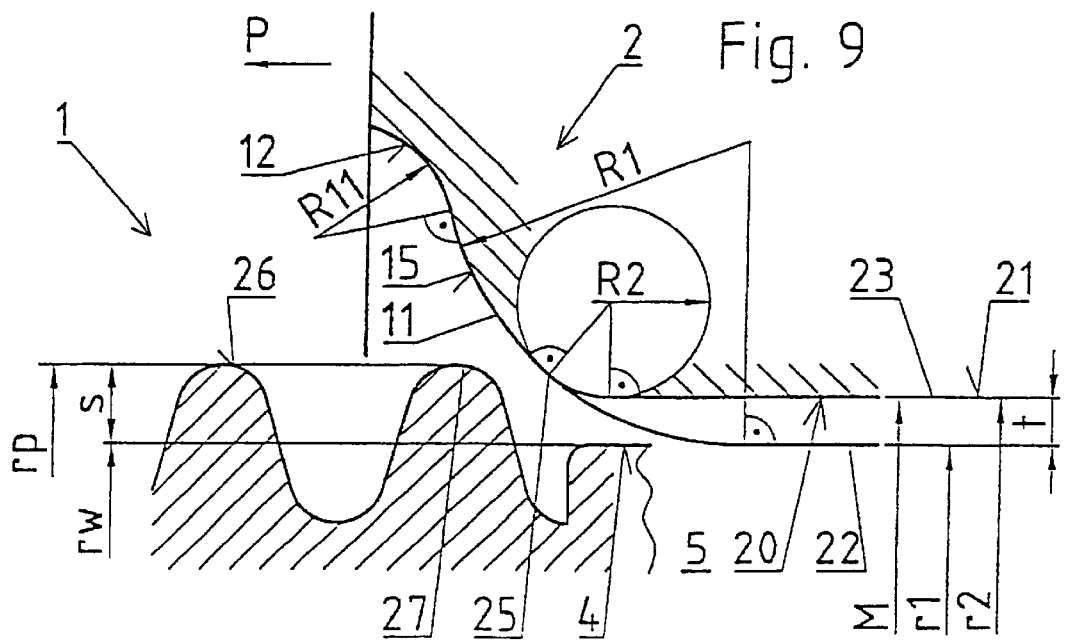

FIGS. 1 and 2 as well as FIG. 9 show another embodiment of the present device. FIG. 9 shows an enlarged detail from this device. Also with this embodiment, the inside wall 6 of the opening 5 is essentially cylindrical and the cylinder has the radius r1. In such an opening 5 of the hub an axially running bulge or indentation 20 having a depth t is present. The wall 21 of this indentation 20 preferably constitutes a section of the a coat of a cylinder, the radius r2 of which is smaller than the radius r1 of the opening 5 in the hub. The axis B of this second cylinder 20 is spaced in a distance e from the longitudinal axis A of the opening 5 in the hub. The axis B runs in parallel to the longitudinal axis A. The distance e between the axis A and B may be denoted as excentricity. It is also possible that the wall 21 of the indentation 20 deviates from the exact geometrical cylindrical shape.

The hub 2 illustrated in FIGS. 1 and 2 is carried out as a cam disk. A cam 14 is elevating over the peripheral area 13 of the main body 3 of the hub 2. Among other things because of the rigidity it is of advantage, to locate the indentation 20 in the hub 2 in such a manner that it lies underneath of the cam 14 of the cam disk 2. Thereby it is particularly of advantage when the indentation 20 is arranged symmetrically with respect to the vertical axis C of the cam 14.

The radius r2 of the cylindrical indentation 20 can be smaller than the radius r1 of the opening 5 in the hub 2. Under this relation between the radiuses r1 and r2, an edge 22 is present at that one place where the walls 6 and 21 of the cylinders 5 and 20 meet one another. This edge 22 may be rounded or sharp-edged. Upon pressing of the shaft 1 into the opening 5 in the hub 2, the material of the shaft 1 penetrates into the indentation 20. Thereby said edges 22 in the interior of the opening 5 in the hub fit laterally into that material of the shaft 1 which is placed in the indentation 20. This measure effectively prevents an accidental free spinning of the shaft 1 in the hub 2 upon high loading of the shaft assembly.

Between the corresponding end portions of the bulge or of the indentation 20 and the transitional arc 11 an arc 25 extends which is tangential connected to the transitional arc 11 and which is also tangential connected to the surface line of the bulge wall 21 (FIG. 9). This embodiment guarantees a favorable flow of the material during the process of joining.

In connection with this embodiment of the hub 2, it can be of advantage, to provide the shaft 1 with circumferential material elevations 26 (FIG. 9). These elevations 26 can be the turns of a thread or they may be rings or collars on the shaft 1 which are arranged perpendicular with respect to the longitudinal axis A of the shaft 1. The height of the vertexes 27 of the turns or of the rings 26 over the shaft main body 4 can also be denoted as s. The distance between two neighbouring circumferential elevations 26 can be designated with p (FIG. 1) and this distance p may be equal to the width of an elevation 26. The radius rp of the elevations 26 may be equal to the distance M between the longitudinal axis A of the opening 5 in the hub 2 and that one bottom line 23 in the wall 21 of the indentation 20, which is most distant from the longitudinal axis A. The radius rp may also be slightly bigger than the distance M.

In principle it is possible to use the shaft 1 with axially running elevations 16 as illustrated in FIGS. 5 to 8 in connection with a hub 2 according to the FIGS. 1 and 2, respectively. The shaft 1 with the circumferential elevations 26 (FIG. 9) may also be used in connection with the other embodiments of the hub 2 disclosed herein.

That one embodiments of the present device having an indentation 20 (FIG. 2) can be manufactured starting from a blank of the hub 2 in which is already provided with a roughly carried out opening 5. In a first step, the hub opening 5 together with the bent section 11 are exactly manufactured. Thereby the workpiece, i.e. the blank of the hub 2, stands still. The manufacturing tool (not illustrated in the figure) is movable and it encompasses a pole-like holder and a projection made up from a very hard material which protrudes from the lateral surface of the holder. Such a boring tool moves along a screw line, the longitudinal axis of which coincides with the longitudinal axis A and the radius of which is roughly equal to the radius r1. The projection or elevation always protrudes radially from the pole-like bearer. During this step of the method according to the present invention, the sections 6 and 10 or 15 of the opening 5 of the hub 2 can be manufactured.

After this first manufacturing step a second boring of the opening 5 in the hub 2 begins. At the beginning of this second manufacturing step the boring tool is moved along the distance e from the longitudinal axis A of the hub 2, i.e. towards the wall 6 of the opening 5. Thereafter the tool moves along a screw line, the longitudinal axis of which runs in parallel to the main axis A and the radius of which corresponds to the radius r2. During this manufacturing step the wall 21 of the bulge or indentation 20, the arc 25 and the edges 22 are manufactured.

According to this method the opening 5 of the hub 2, the indentation 20 and the arcs 11, 12 and 25 can consequently be manufactured on the same machine.

If the requirements with respect to the stability of the hub 2 and the density of the hub material are not extraordinarily high, in many cases a sintering process is suitable for the manufacturing of the parts of the hub 2. In this method, steel powder is squeezed to a so-called semifinished piece, which is hardened in a sintering oven to the necessary hardness. This method is economically most efficient upon manufacturing large numbers of these pieces. The hub bores having the radiuses r1 and r2 and the corresponding, tangentially running radiuses R1, R11 and R2 can be manufactured according to this method without chip-removing treatment.

FIG. 10 shows a still further embodiment of the present device. The shaft 1 is already equipped with the afore mentioned axial running elevations. In the inside wall 6 of the hub 2 the circumferential deepenings 17 are also carried out as described before. The depth f of the deepenings 17 in the hub 2 is at least as big as the height s of the axially running elevations 16. The axially running elevation 16 is preferably made from a harder or more rub-resistant material than the hub.

According to the embodiment illustrated in FIG. 11, the hub 2 is fixed on one of the ends of the shaft 1. The end portion of the shaft 1 which is bearing the hub 2 is equipped with a flange 31 to stop the hub 2. The radius rw of the shaft 1 and the radius rp of the elevations on the shaft 1, respectively, can be manufactured together with the flange 31 by chip-removing techniques, in the case of the present embodiment of the invention.

The length of the bulged section 32 of the shaft 1 is chosen in such a manner that a portion 33 of the shaft section 32 sticks out from the hub opening 5. After the hub 2 has been pressed in the above described manner onto the shaft 1 up to the stop at the flange 31, the part 33 protruding from the opening 5 is additionally formed as to wedge the hub 2. The circular flange 34 of the so deformed part 33 resembles a headpiece of the shaft 1 flattened by hammering, which guarantees an especially tight fit of the hub 2 on the shaft 1.

FIG. 12 shows an embodiment of the present device, whereby the opening 5 in the hub 2 shows a similar contour 5 as the opening 5 of the hub 2 according to FIG. 2. The difference between the contours of the openings 5 shown in FIGS. 2 and 12 consists in the course of the contour line in the transition region 24 between the wall 6 of the hub opening 5 and the wall 21 of the indentation 20. In the embodiment illustrated in FIG. 12, the transition region has the shape of an arc 24. This arc 24 can be a section of a circle 28 having a radius r4. This section 24 of a circle is connected tangentially both to the wall 6 of the hub opening and also to the wall 21 of the indentation 20. With a hub according to FIG. 2, the contour line of that transition region 24 has an unsteady course so that an edge 22 is present here on the hub 2.

The shape according to FIG. 12 is manufactured in such a way that a so called end milling cutter having the radius r2 is introduced in the drill hole constituting the opening 5 and that this milling cutter is moved in the opening 5 in such a manner that the arched transition region 24 is formed.

The profile of the wall 6 of the opening 5 in the hub according to FIG. 13 is a modification of the profile illustrated in FIG. 12. The profile of the wall of the indentation according to FIG. 12 is a composite profile which comprises two arcs 211 and 212 and one linear section 213 extending between these arcs 211 and 212. The arcs 211 and 212 have an angle length of practically only 90°. One end of each of these arcs 211 and 212 is connected tangential to the neighbouring and afore mentioned arched shaped transition region 24. The respective opposite end of the respective arched shaped transition region 24 goes over tangentially into the straight line shaped section 213 of the profile of the indentation 20.

FIG. 14 shows an embodiment of the indentation 20 having an angular, in the shown case a quadrangular profil.

FIG. 17 shows a further developed embodiment of the profile or of the contour of the opening 5 in the hub 2, respectively, which are described in connection with FIG. 12. The hub 2 according to FIG. 17 has four indentations 20 whereby always two, pairwisely, are diametrally set apart. The contour or profile of the transition region 24 between the respective neighbouring indentations 20 is arc shaped. This arc 24 can be a section of an circle 28, whereby the end parts of the contour line of the neighbouring indentations 20 goes over tangentially into the end parts of the respective circular arc 24. Consequently the contour of the wall 6 of the opening 5 in the hub 2 is a curve composed from arcs whereby a convex and a concave arc are alternating. Therefore, the contour line of this hub opening 5 has the shape of a wave or sinusoidal line.

What is claimed is:

1. A device having a shaft (1) and at least one hub (2) which is securable on this shaft, said shaft and said hub each having a longitudinal axis (A) and the longitudinal axis of said shaft is coaxial with the longitudinal axis of said hub when said hub is secured to said shaft, wherein:

said hub is provided with an interior wall (6) delimiting an opening (5) that extends along the longitudinal axis of said hub, and said hub has two lateral surfaces that are spaced apart along the longitudinal axis of said hub;

said opening has two margins (10, 30) each located adjacent a respective one of said lateral surfaces, and a main part that extends between said margins;

at least one of said margins of said opening has a curved profile (11) in planes containing the longitudinal axis of said hub;

said curved profile meets said main part of said opening tangentially; and said opening has a first radius (r1) and has an indentation (20) in said interior wall, and said indentation has the form of a section of a cylinder that has a second radius (r2) that is smaller than the first radius (r1) and that has an axis (B) that is offset from the longitudinal axis of said hub by a distance (e).

2. The device according to claim 1, wherein:

said interior wall delimiting said opening is configured as a surface of a geometrical structure defined by a generatrix that is a step line or a straight line that is parallel to or convergent with respect to the longitudinal axis of said hub.

3. The device according to claim 1, wherein the axis (B) of said cylinder is parallel to the longitudinal axis of said hub.

4. The device according to claim 1, said interior wall delimiting said opening meets said indentation (20) at a transition region (24) that has an unsteady course so that at least one edge (22) is present along said opening.

5. The device according to claim 1, wherein:

said interior wall delimiting said opening meets said indentation at a transition region (24) that has a shape of an arc of a circle (28) having a third radius (r4);

the third radius is smaller than the first radius; and said transition region is convexly oriented such that a first end portion of said transition region is connected tangentially to said interior wall delimiting said opening and a second end portion of said transition region is connected tangentially to the said indentation.

6. The device according to claim 1, wherein said indentation has a composite profile composed of two arcs (211, 212) and one linear section (213) extending between said arcs (211,212), each of said arcs (211,212) has an angular extent of substantially only 90 degrees, one end portion of each of said arcs (211 or 212) is connected tangentially to an adjacent arch shaped transition region (24) and another end portion of each of said arcs (211 or 2120 that is opposite to the one end portion is connected tangentially to said linear section (213).

7. The device according to claim 1, wherein:

said shaft has an outer surface that has a radius and from which project axially (16) or circumferentially (26) running elevations;

each of said elevations has a top that is spaced from the longitudinal axis of said shaft by a distance (N,rp) that is greater than the radius of said outer surface of said shaft;

the first radius of said opening in said hub (2) is smaller than the distance (N,rp) of said elevations the longitudinal axis of said shaft; and said elevations are placed at least in an area of said shaft that extends through said hub when said hub is secured on said shaft.

8. The device according to claim 7, wherein:

said elevations on said shaft run circumferentially;

said elevations are turns of a thread or ring or collars on said shaft;

said indentation has a portion that is most distant from the longitudinal axis (A) of said shaft;

the distance between the top of said elevations and the longitudinal axis of said shaft is substantially equal to or greater than the distance (M) between the longitudinal axis of said hub and the portion of said indentation that is most distant from the longitudinal axis of said shaft.

9. The device according to claim 7, wherein:

said elevations on said shaft run axially;

said interior wall of said hub is further provided with circumferential, substantially annular deepenings (17) that extend in a direction that is substantially perpendicular to the longitudinal axis of said hub;

said deepenings are spaced apart from one another along the longitudinal axis of said hub;

each of said deepenings has a depth, perpendicular to the longitudinal axis of said hub, that is at least as great as the distance between the tops of said elevations and the outer surface of said shaft; and said elevations are made of a material that is harder than the material of said interior wall of said hub.

10. The device according to claim 1, wherein:

said curved profile at said one of said margins of said opening is convex;

said indentation has an end at said one of said margins of said opening, and a main part that extends from said end;

said end of said indentation has a section profile (25) that has a convex shape in planes containing the longitudinal axis of said hub; and said second profile extends between said curved profile at said one of said margins of said opening and said main part of said indentation and meets said main part of said indentation tangentially.

11. The device according to claim 1, wherein:

said curved profile at said one of said margins of said opening includes at least first and second curved profile sections (11, 12);

said first section (11) is convex and extends from said main part of said opening of said hub;

said second section (12) is concave and extends from said first section to that one of said lateral walls that is adjacent said one of said margins; and said first and second sections meet one another tangentially.

12. The device according to claim 1, wherein:

said shaft has an end portion to which said hub is secured;

said end portion of said shaft has a flange or a seat (31) for engaging one of said lateral surfaces of said hub, a hub supporting section and an end section that projects beyond said hub when said hub is secured to hub supporting section and said one of said lateral faces is bearing against said flange or seat; and said end section of said end portion is arranged to be deformed to form a second flange that bears against the other one of said lateral surfaces after said hub has been placed on said hub supporting section.

13. The device according to claim 1 wherein, prior to assembly of said shaft with said hub, said shaft has a cross-sectional shape different from that of said opening in said hub.

14. A method for manufacturing the device according to claim 1, comprising:

providing a hub blank having a prepared preliminary opening;

performing a first boring operation to form the opening (5) that extends along the longitudinal axis of the hub and the curved profile (11); and then performing a second boring operation to form the indentation (20).

15. A method for manufacturing the device according to claim 1, comprising carrying out a sintering process to produce the hub (20).

16. A device having a shaft (1) and at least one hub (2) which is securable on this shaft, said shaft and said hub each having a longitudinal axis (A) and the longitudinal axis of said shaft is coaxial with the longitudinal axis of said hub when said hub is secured to said shaft, wherein:

said hub is provided with an interior wall (6) delimiting an opening (5) that extends along the longitudinal axis of said hub, and said hub has two lateral surfaces that are spaced apart along the longitudinal axis of said hub;

said opening has two margins (10, 30) each located adjacent a respective one of said lateral surfaces, and a main part that extends between said margins;

at least one of said margins of said opening has a curved profile (11) in planes containing the longitudinal axis of said hub;

said curved profile meets said main part of said opening tangentially; and said interior wall delimiting said opening has a contour composed of a plurality convex arcs alternating about the longitudinal axis of said hub with a plurality of concave arcs, so that said contour has the shape of a wave line.

17. The device according to claim 16, wherein:

the contour of said interior wall delimiting said opening is composed of four concave arcs forming indentations and four convex arcs forming transition regions;

said indentations are arranged in pairs so that the indentations of each pair are diametrically opposed to one another; and said convex arcs are arcs of circles that meet adjacent concave arcs tangentially.

18. The device according to claim 16 wherein, prior to assembly of said shaft with said hub, said shaft has a cross-sectional shape different from that of said opening in said hub.

* * * * *